May 20, 1930. A. D. ANTOINE ET AL 1,759,031
DISPLAY DEVICE FOR VENDING MACHINES
Filed June 2, 1928 7 Sheets-Sheet 4

Inventors
Alfred D. Antoine
Albert E. Gebert
By
Atty.

Patented May 20, 1930

1,759,031

UNITED STATES PATENT OFFICE

ALFRED D. ANTOINE, OF CHICAGO, AND ALBERT E. GEBERT, OF WILMETTE, ILLINOIS, ASSIGNORS TO ADVANCE MACHINE COMPANY, OF CHICAGO, ILLINOIS, A CORPORATION OF ILLINOIS

DISPLAY DEVICE FOR VENDING MACHINES

Application filed June 2, 1928. Serial No. 282,387.

This invention relates to improvements in vending machines, and one of the objects of the same is to provide an improved machine of this character which will upon the insertion of a proper check or token deliver to the operator an article or commodity, and at the same time visually display a card or picture, mechanism being also provided for concealing the latter until after the insertion of the check.

A further object is to provide improved means for concealing the picture or card at a predetermined time in the operation of the mechanism.

A further object is to provide improved means for selectively positioning a plurality of cards to be viewed by the operator of the machine.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which

Referring more particularly to the drawings the numeral 10 designates the front plate of a casing 11 and upon which front plate the operating mechanism is mounted. This plate 10 is removably secured in position to form a closure for the casing and is held in position by means of a suitable lock 12.

The plate 10 is provided with a sight opening 13 adjacent one end thereof, for a purpose to be hereinafter described.

Rotatably mounted upon a supporting shaft 14, which latter is itself supported in any suitable manner upon the plate 10, is a disc 15 which may be of any desired construction and of any desired diameter, and carried by the front of the disc, which latter is disposed in close proximity to the rear face of the plate 10 are suitable characters, legends, or any other suitable matter (not shown) which it is desired to expose through the opening 13.

The disc 15 is so arranged that a portion thereof will be disposed behind the opening 13 so that when the disc is revolved different subjects matter will be presented to view through the opening 13.

Supported by the plate or member 10 is a container 16 for containing articles 18 to be vended and this container may be of any desired size and configuration, and movable therein is a weight 19 which rests upon the articles 18 to cause them to assume their proper position so as to be ejected through an opening 20 into a delivery chute 21 that passes through the front of the casing or plate 10 (not shown) to be delivered to the customer.

The articles 18 are ejected from the container 16 by means of a suitable sliding ejector 22 which is reciprocable upon a support 23.

The ejector 22 is operated in any suitable manner preferably by means of a lever 24 pivotally mounted intermediate its ends as at 25. One end of the lever 24 is deflected as at 26 to enter an opening in a projection 27 that is carried by the ejector so that when the lever 24 is reciprocated the ejector 22 will also be reciprocated.

This lever is operated in any suitable manner, preferably by means of a pin or projection 28 that is carried by a disc 29. The disc 29 (see particularly Figure 7) is carried by a shaft 30 suitably mounted and which shaft extends through the front or plate 10 of the casing and has connected with it an operating handle 31 by means of which the shaft and the disc 29 are rotated. The disc 29 is adapted to be rotated upon the insertion into the machine of a proper check or token, the latter being inserted through an opening 32 in the front of the casing, the disc 29 being held against rotation until the insertion of a proper check.

Any suitable check controlled mechanism for controlling the operation of the disc 29 may be provided, but the specific construction of this portion of the mechanism forms no part of the present invention.

A suitable and efficient check controlled mechanism adapted for this purpose is shown and described in United States Letters Patent No. 1,452,721, issued April 24, 1923.

Figure 1:
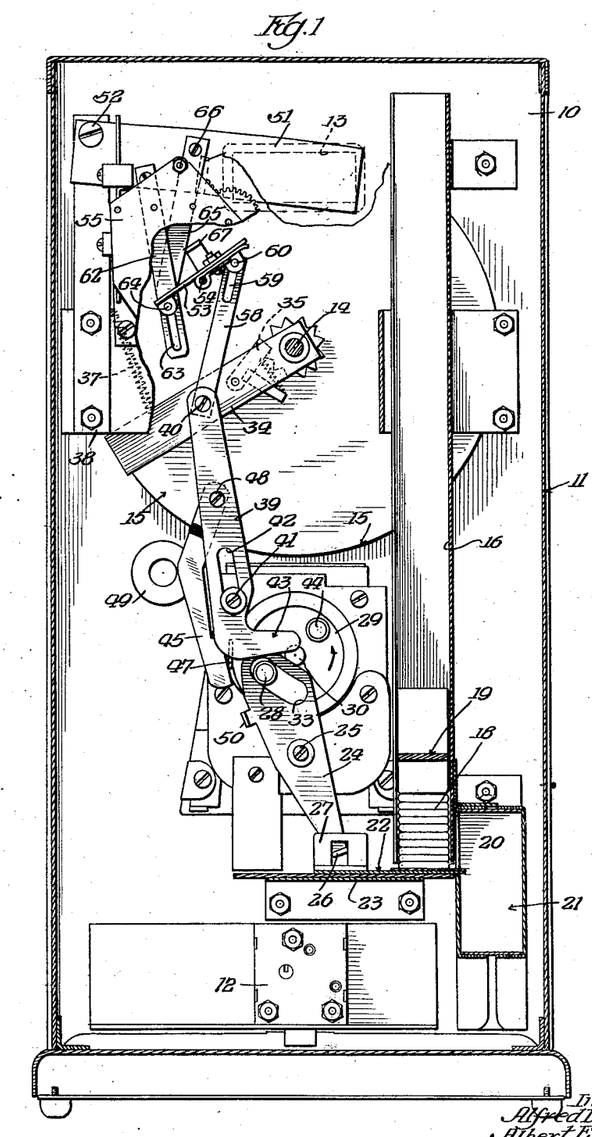
Figure 1 is a rear elevation, partly in section and partly broken away of a mechanism of this character constructed in accordance with the principles of this invention and showing the parts in one position.
Figure 2:
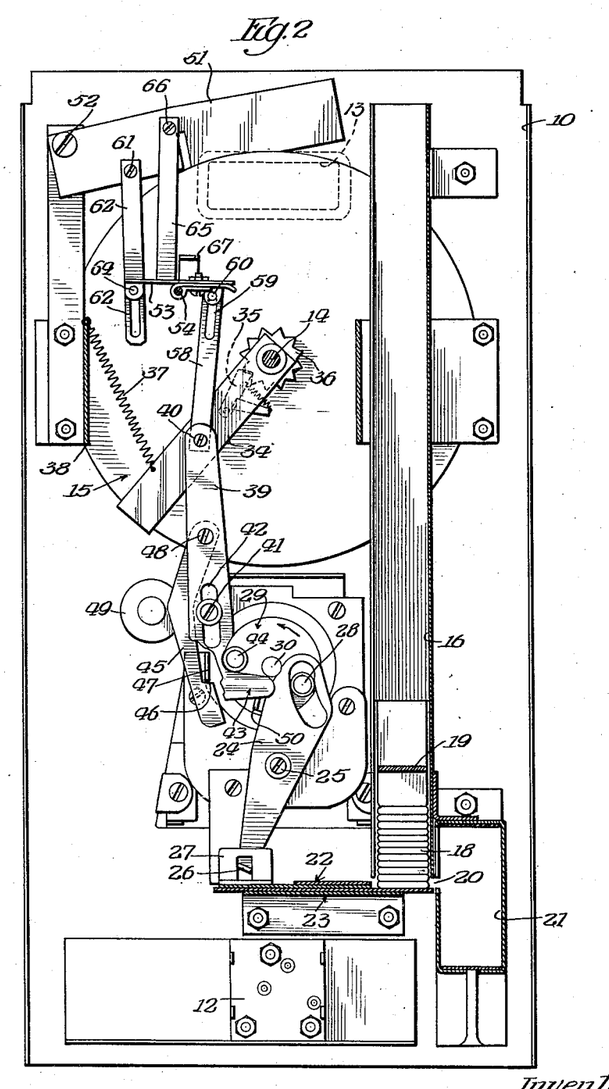
Figure 2 is a view similar to Figure 1, showing the parts in a different position.

Upon the insertion of the proper check in the slot 33, the disc 29 may be rotated and during its rotation in the direction indicated by the arrow in Figures 1 and 2, the projection 28 which operates in the slot 33 in the end of the lever 24, will rock the lever about its pivot 25 to move the ejector 22 forwardly from the position shown in Figure 2 to the position shown in Figure 1 and thereby eject the lowermost of the supply of articles 18.

When the disc 29 is returned from the position shown in Figure 1 to the position shown in Figure 2, the ejector 22 will be retracted.

The disc 15 is adapted to be given rotation by means of a lever 34 which is pivotally mounted by one end upon the shaft 14. Carried by the lever 34 is a spring controlled dog 35 which co-operates with a ratchet wheel 36, the latter being secured to the disc 15 for rotation therewith.

The lever 34 is of any desired length and operating thereupon is a spring 37 which tends normally to move the lever 34 in one direction, a stop 38 being provided against which the lever 34 engages to limit the movement of the lever in one direction under the influence of the spring 37.

The lever 34 is moved in the opposite direction by means of a member 39 which is pivotally connected at one end as at 40 with a lever and is guided in its movement by means of a fastening device or bolt 41 that passes through a slot 42 in the member 39, the fastening device 41 engaging any suitable fixed support.

The free end of the member 39 is deflected laterally as at 43 and is disposed adjacent the disc 29 and in the path of movement of another projection 44 that is carried by the disc 29 so that when the disc 29 is rotated in the direction indicated by the arrows in Figures 1 and 2, the projection 44 will engage the portion 43 of the member 39 and lower the same together with the lever 34 against the stress of the spring 37, thereby moving the dog 35 to the position shown in Figure 2, and the member and lever 34 will be held in the position shown in Figure 2, by means of a catch 45 having a shoulder 46 adapted to engage under a projection 47 on a fixed support. The catch 45 is pivotally connected as at 48 preferably with the member 39 and a weight 49 is provided which tends to move the shouldered portion 46 of the catch in a direction to engage under the shoulder or projection 47.

The lever 34 and member 39 will be thus locked in their lowermost position or as shown in Figure 2, while the disc 29 is being rotated in a direction opposite to the direction indicated by the arrows in Figure 2, and the lever 34 will be thus locked until the projection 28 has moved the ejector 22 forwardly to eject the lowermost article 18 through the opening 20. This will also lock the controlling and timing mechanism, that is the escapement member 53, through the medium of the link 58, slot 59 and projection 60. When the lever 24 is thus moved about its pivot 25 a projection or formation 50 on the lever 24 will engage a portion of the catch 45 and swing the latter about its pivot 48 to disengage the shoulder 46 from beneath the shoulder 47, thereby releasing the member 39 and the lever 34 so that the energy stored in the spring 37 will quickly shift the lever 34 about its pivot and this movement of the lever 34 through the medium of the pawl 35 engaging the ratchet 36 will rotate the disc 15.

The upward movement of the lever 34 will be arrested by its engagement with the stop 38 and also by the engagement of the lower end of the slot 42 in the member 39 with the screw or fastening member 41.

When the shoulder 46 is under the shoulder 47 the parts will be maintained in a locked position by means of the stress of the spring 37. Therefore, in order to release the catch 45 the disc 29 must be rotated by the operator in a direction opposite to the direction of the arrows shown in Figures 1 and 2, so as to apply some little force to the disc and the lever 24 to disengage the shoulder 46 of the catch 45 from the shoulder 47.

In order to prevent exposure of the matter appearing on the face of the disc 15 and through the opening 13, a shutter 51 is provided. This shutter is pivotally mounted as at 52 and may be of any desired construction and configuration. Suffice it to say, that the shutter is such that when it is moved about its pivot from the position shown in Figure 2, to the position shown in Figure 1, the opening 13 will be closed and vice versa.

The operation of the shutter is controlled through the medium of a member 53 that is connected with a shaft 54 of an escapement mechanism designated generally by the reference numeral 55. The specific construction of the escapement mechanism aside from the member 53 which is connected thereto, forms no part of the present invention as any suitable escaping mechanism may be employed. A suitable and efficient mechanism of this character is shown and described in United States Letters Patent No. 1,370,578, issued March 8, 1921. Suffice it to say that the escapement mechanism embodies a ratchet wheel 56 (see Figure 7) having a ratchet device 57 that is connected with the shaft 54 of the escapement mechanism. The shaft 54 is turned in one direction so as to wind up the escapement by means of a link 58 that is provided with a slot 59 into which a projection or extension 60 connected with the member 53 projects and operates. The other end of the link 58 is pivotally connected preferably with the lever 34 through the medium of the pivot element 40 of the member 39.

Pivotally connected to the shutter 51 by one end as by means of a pivot 61, is a link 62 which is provided with a slot 63 into which a projection 64 on the member 53 operates, and the slot 63 is so arranged that when the link 58 is lowered from the position shown in Figure 1 to the position shown in Figure 2, by lowering the lever 34, the end of the slot 59 will engage the projection 60 and move the member 53 in a direction to turn the shaft 54 so as to wind up the escapement. At the same time that the member 53 is being thus moved the projection 64 will engage the end of the slot 63 in the link 62 to move the shutter 51 about its pivot 52 from the position shown in Figure 1 to the position shown in Figure 2 and thereby uncover the opening 13 in the front plate 10 of the machine so as to expose to view the matter appearing on the face of the disc 15.

The shutter 51 will be held in its elevated position as shown in Figure 2 by means of a member 65 which is pivotally connected at one end as at 66 with the shutter 51. The lower end of the member 65 is adapted to engage and rest upon the member 53 when the latter assumes the position shown in Figure 2.

As soon as the escapement begins to operate the member 53 will start to move from the position shown in Figure 2 to the position shown in Figure 1, but the shutter 51 will not be lowered to close the opening 13 until the end of the member 65 is moved off of the member 53. This is accomplished by means of a projection 67 carried by the member 53 and which at a predetermined time in the cycle of movement of the member 53, will engage the member 65 to swing it about its pivot as the member 53 is approaching the position shown in Figure 1. This will move the end of the member 65 off of the member 53, the member 53 being cut away to permit such a disengagement, and the shutter 51 will then drop of its own weight to close the opening 13. The shutter 51 is limited in its lowering movement by the engagement of the end of the slot 63 in the link 62 with the projection 64 on the member 53.

The slot 59 in the link 58 with the projection 60 operating therein is provided for the purpose of preventing injury to the escapement mechanism when the lever 34 is suddenly raised by the stress of the spring 37 and is also provided so as not to interfere with the operation of the member 53 by the escapement mechanism.

The operation of the shutter 51 is so timed that it will remain raised for a predetermined time in the cycle of operation of the machine and is governed by the length of time that the escapement mechanism operates and such length of time is sufficient to allow the matter on the face of the disc 15 to be exposed through the opening 13 for a short interval of time after the ejection of the article 18 and before the shutter moves across the opening 13.

Figure 3:
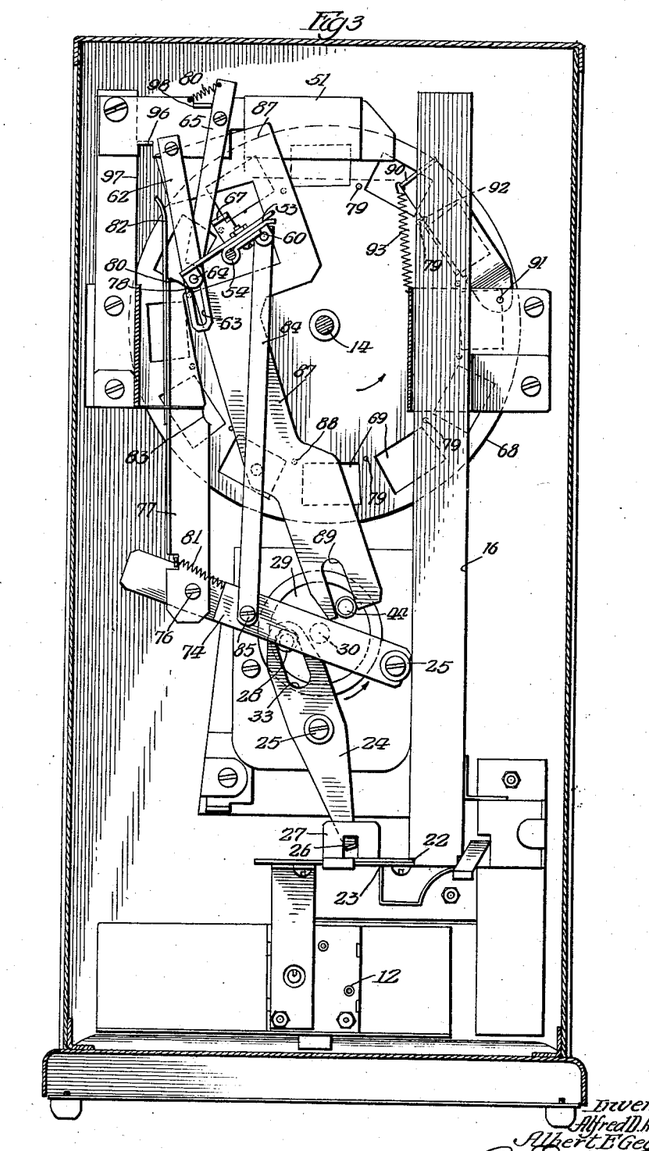
Figure 3 is a view similar to Figure 1 of a modified form of the invention.
Figure 4:
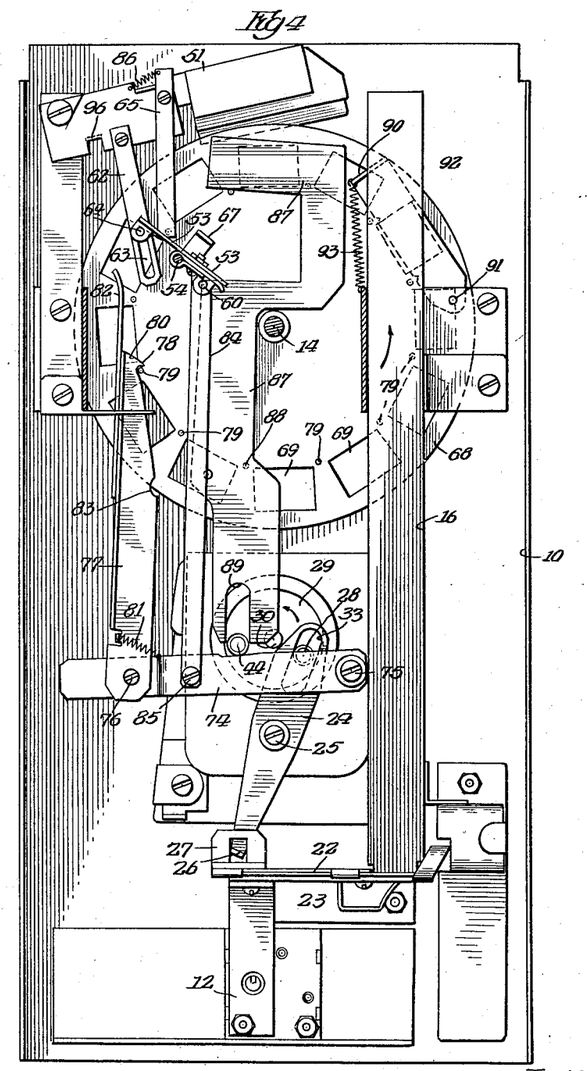
Figure 4 is a view similar to Figure 3, showing the parts in another position.

In the form of the invention shown in Figures 3 and 4, the disc 68 is rotatably mounted upon the shaft 14 and is provided with a plurality of openings 69 therethrough for the reception of transparent pictures, and in this form of the machine the pictures are viewed through a sight opening preferably in the form of a tubular extension 70 projecting from the front plate 10 of the machine (see particularly Figure 7) through which the operator views the picture, and which projection is provided with a lens 71 arranged in alinement with the openings in the disc. In order that this type of picture may be visible the back wall 72 of the casing is provided with a portion 73 to permit the entrance of light.

Figures 7, 8, 9:
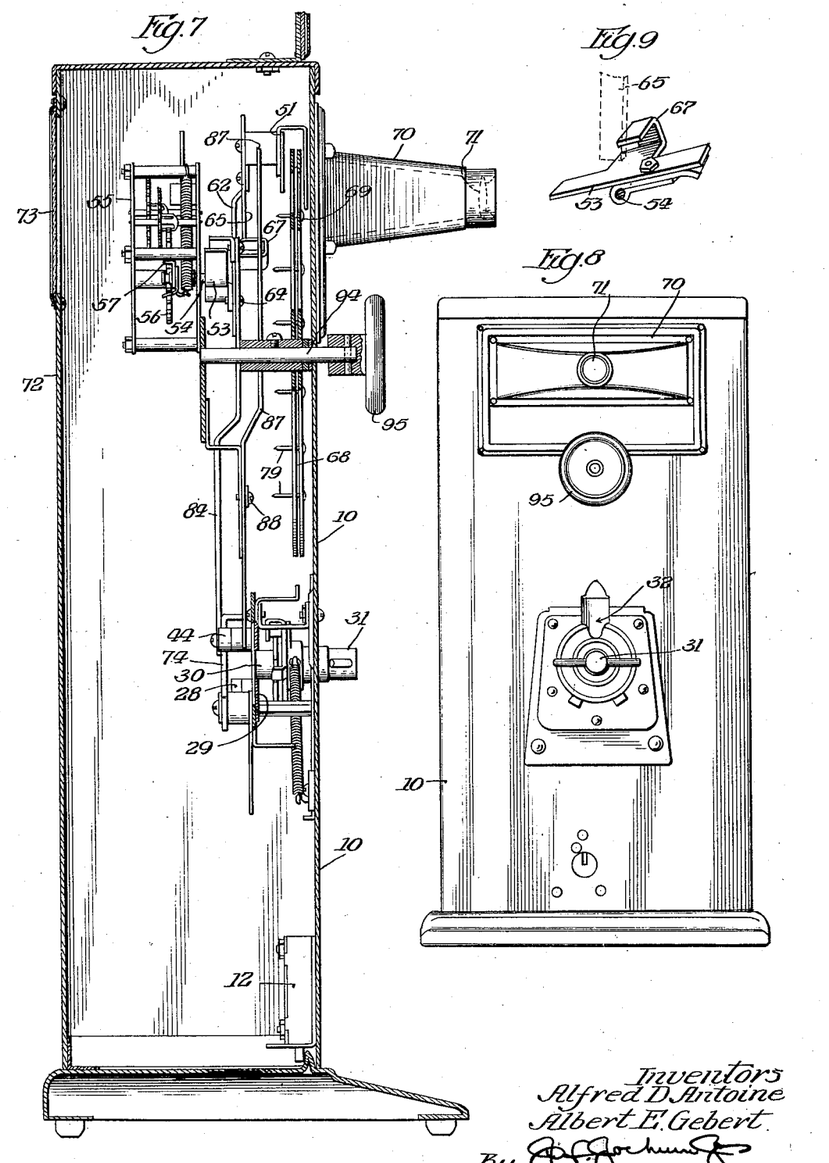
Figure 7 is a vertical sectional view taken on line 7—7, Figure 5.
Figure 8 is a front elevation of Figure 7.
Figure 9 is a perspective view of a detail of the trip mechanism for one of the shutters.

The disc 68 is rotated from the disc 69 through the medium of a lever 74 pivotally mounted by one end as at 75 to a fixed support, and pivotally connected at one end as at 76 to the lever 74 is a dog 77 having a shouldered portion 78 that is adapted to successively engage over a plurality of pins or projections 79 suitably arranged preferably between the openings 69 and project laterally beyond the rear face of the disc, as shown more clearly in Figure 7.

The upper end of the dog 77 is beveled as at 80 and a spring 81 tends normally to move the dog 77 about its pivot 76 in a direction that the shoulder 78 will engage over one of the pins or projections 79. When the disc 68 is moved in the direction indicated by the arrow in Figures 3 and 4, the pins or projections 79 will engage the beveled end 80 of the dog 77 and move it backwardly about its pivot 76 and against the stress of the spring 81 to permit the pin to pass after which the spring 81 will cause the dog to move into the position shown in Figure 4 to engage over the adjacent pin or projection 79. A projection 82 may be provided on the dog 77 to extend therebeyond and thereby prevent the dog from moving too far forwardly about its pivot 76 under the stress of the spring 81 by the engagement of the projecting portion 82 contacting with the advancing pins or projections 79.

A cut away portion 83 may also be provided in the dog 77 so that the pins will not interfere with the operation of the dog after the pins have passed away from the shoulder 78.

The lever 74 is moved in one direction about its pivot so as to raise the dog 77, by the escapement mechanism, and to that end a link 84 is pivotally connected by one end as at 85 with the lever 74 and by its other end with the projection 60 on the member 53 which is connected with the shaft 54 of the escapement mechanism so that when the escapement mechanism has unwound and the member 53 has been moved from the position shown in Figure 4 to the position shown in Figure 3, the lever 74 will be raised as shown in Figure 3, to position the dog 77 to contact with one of the projections 79 so that when the lever 74 is depressed the dog 77 will turn the disc 68.

The lever 77 is moved downwardly and the member 53 of the escapement is moved from the position shown in Figure 3 to the position shown in Figure 4 by means of the projection 44 on the disc 29 when the disc is moved in the direction indicated by the arrow in Figures 3 and 4. Upon this movement of the disc the projection 28 will engage the top edge of the lever 74 and move it from the position shown in Figure 3 to the position shown in Figure 4, thereby drawing down upon the dog 77 and rotating the disc 68, at the same time drawing down or rocking the member 53 of the escapement to turn the shaft 54 of the escapement so that the member 53 will assume the position shown in Figure 4.

When the disc 59 is moved in a direction opposite to that shown by the arrows in Figures 3 and 4, the spring in the escapement mechanism (not shown) will raise the lever 54 through the medium of the link 84 and will also raise the dog 77 to the position shown in Figure 3. At the same time the lever 24 will be operated to shift the element 22 to dispense one of the articles in the container 16.

In order to conceal from view the pictures carried by the disc 68, during the insertion of a proper check, the shutter 51 will be moved to a position to close the opening 13 in the front of the casing and also will be moved across the picture in the opening 69 in the disc which is in alinement with the opening 13. The shutter 51 in this form of the invention is operated in the same manner as in the form shown in Figures 1 and 2 and instead of relying upon gravity to move the member 65 to the position shown in Figure 4, to hold the shutter 51 elevated so that it will uncover the opening 13, a spring 86 may be provided.

In addition to the shutter 51 and as a means for preventing the picture which is in alinement with the opening 13 from being viewed while the coin is being inserted and to prevent a partial operation of the machine and the holding of the pictures in the position to be viewed before the check or coin is delivered into the machine, an additional shutter 87 is provided which operates alternately with the shutter 51. The shutter 51 preferably operates in front of the disc 66, while the shutter 87 preferably operates in the rear of the disc. The shutter 87 is pivotally mounted upon a pivot 88 carried by a fixed support and the shutter is so shaped that the shaft 14 will not interfere with the operation thereof.

This shutter 87 is adapted to be actuated by the projection 44 on the disc 29 and to that end the projection 44 is adapted to operate in a slot 89 in the end of the shutter 87. The shutter 87 is so arranged that it will normally assume the position shown in Figure 3, while the normal position of the shutter 51 is also shown in Figure 3.

Upon the insertion of the check and when the disc 29 is rotated in the direction indicated by the arrow in Figures 3 and 4, the shutter 87 will be moved to the position shown in Figure 4 and will assume that position before the shutter 51 begins to raise. As soon as the check is delivered into the machine and the ejector 22 retracted to the position shown in Figure 3, the shutter 87 will have been moved to the position shown in Figure 3, and at the same time the shutter 51 will have been moved to the position shown in Figure 4, thereby moving both of the shutters to positions that the operator may view the picture in the opening 69 which is arranged in alinement with the lens 71 and the opening 73 in the back wall of the casing.

As soon as the disc 29 is returned to its normal position, or to the position shown in Figure 3, the escapement mechanism 55 will begin to operate causing the member 53 to be moved from the position shown in Figure 4 to the position shown in Figure 3. At a predetermined time in the cycle of operation of the escapement the projection 67 on the member 53 will move the member 65 off of the member 53 and thereby allow the shutter 51 to assume the position shown in Figure 3, the shutter 87 having previously been moved to the position shown in Figure 3.

Upon the insertion of the coin and the rotation of the disc 29 the shutter 87 will be moved to the position shown in Figure 4 before the shutter 51 is moved from the position shown in Figure 3.

As a means for preventing the disc 68 from overthrowing, there may be provided a retaining dog or member 90 (see Figure 3) which is pivotally mounted as at 91 to a fixed support and is provided with a notch 92 adapted to engage over the projections 79, a spring 93 being provided which tends to move the member 90 in a direction that the notch 92 will engage the projections.

In both forms of the invention just described a commodity is vended with the operation of the mechanism and of the positioning of the matter to be displayed through the front of the machine and carried by the discs 15 and 68.

Figure 5:
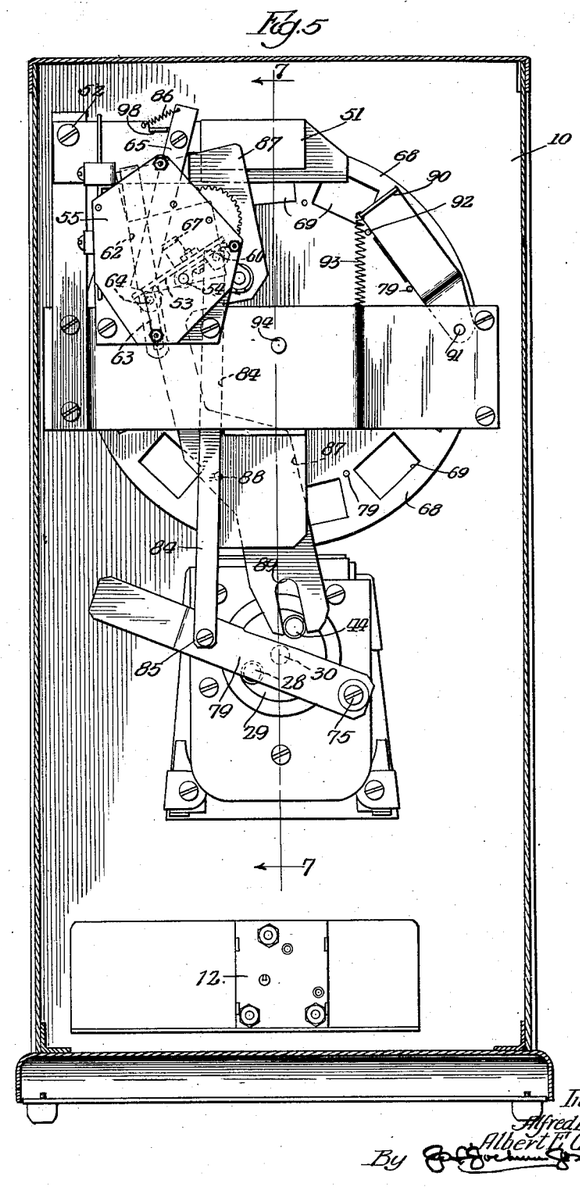
Figure 5 is a view similar to Figure 1 of still another form of the invention.
Figure 6:
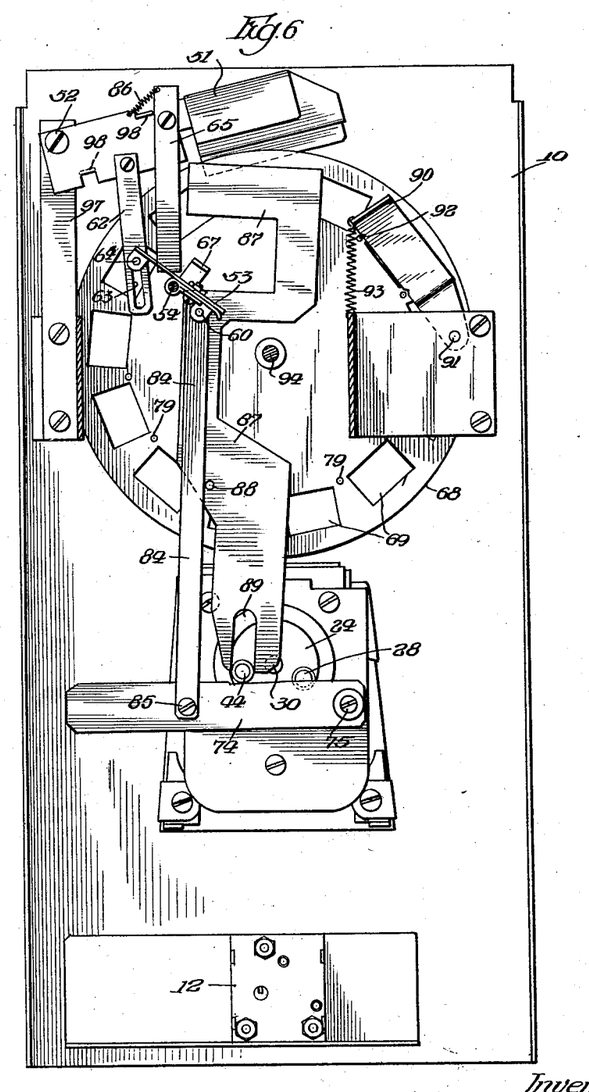
Figure 6 is a view similar to Figure 5, with parts omitted and partly in section, showing the parts illustrated in Figure 5 in another position.

In the form of the invention shown in Figures 5 to 7, the disc 68 is adapted to be rotated at the will of the operator, and to that end the disc is mounted upon a shaft 94 for rotation therewith, the shaft being mounted in suitable bearings. The shaft 94 projects through and beyond the front plate 10 of the machine and secured thereto is a handle 95 which is arranged in a convenient position for the operator. By means of the handle the operator may rotate the disc at will.

When both of the shutters 51 and 87 are moved to positions that they will be out of alinement with the openings 69 in the disc 68, the lens 71 and the opening 73 in the back 72 of the casing and after the proper check has been inserted in the mechanism and the disc 29 rotated to move the shutter 87 into the position shown in Figure 3 and the shutter 51 to the position shown in Figure 6, the operator may rotate the disc 68 at will and may continue to rotate the latter until the shutter 51 is moved to the position shown in Figure 5. This will happen just at the time that the escapement mechanism has exhausted its energy, or "run down."

In both of the forms of the invention shown in Figures 3 to 6, the shutter 51 may be limited in its lowering movement by means of a projection 96 which engages a stop 97 and the member 65 is limited in its movement in one direction by a stop 98.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. A machine of the character described embodying a sight opening, a rotatable member movable past said opening and containing matter to be exhibited through said opening, means for rotating the said member, a shutter for closing said opening to a view of said matter therethrough, check controlled means for controlling the operation of said shutter in one direction, and means operating to control and time the return movement of the shutter.

2. A machine of the character described embodying a sight opening, a rotatable member movable past said opening and containing matter to be exhibited through said opening, means for rotating the said member, a pivotally mounted shutter adapted to obstruct the view through said opening, check controlled means for controlling the movement of said shutter in one direction about its pivot, and automatic means operating to move the shutter in the opposite direction.

3. A machine of the character described embodying a sight opening, a rotatable member movable past said opening and containing matter to be exhibited through said opening, means for rotating said member, a shutter for obstructing the view through said opening, check controlled means for controlling the movement of the shutter in one direction, and additional means automatically rendered active for controlling the movement of the shutter in the opposite direction.

4. A machine of the character described embodying a sight opening, a rotatable member movable past said opening and containing matter to be exhibited through said opening, means for rotating said member, a pivotally mounted shutter adapted to obstruct the view through said opening, check controlled means for controlling the movement of the shutter in one direction about its pivot, and additional means automatically rendered active for controlling the movement of the shutter about its pivot in the opposite direction.

5. A machine of the character described embodying a sight opening, a rotatable member movable past said opening, a shutter movable to a position to close said opening, an operating handle, means responsive to the actuation of said handle for moving the shutter in one direction, and means operating automatically for timing the movement of said shutter in the opposite direction.

6. A machine of the character described embodying a sight opening, a rotatable member movable past said opening, a shutter movable to a position to close said opening, an operating handle, means responsive to the actuation of said handle for moving the shutter in one direction, and means adapted to be rendered active by the operation of said handle for automatically timing the movement of said shutter in the opposite direction.

7. A machine of the character described embodying a sight opening, a rotatable member movable past said opening, a shutter movable to a position to close said opening, an operating handle, means responsive to the actuation of said handle for moving the shutter in one direction, and means embodying escapement mechanism adapted to be rendered active by the actuation of said handle for automatically timing the movement of said shutter in the opposite direction.

8. A machine of the character described embodying a sight opening, a rotatable member movable past said opening, a shutter movable into and out of positions to respectively cover and uncover said opening, means responsive to the movement of said handle to move the shutter in one direction, means adapted to be set by the operation of said handle to temporarily restrain the shutter against return movement, and means adapted to automatically actuate the last recited means to control and time the return movement of said shutter.

9. A machine of the character described embodying a sight opening, a rotatable member movable past said opening, a shutter movable into and out of positions to respectively cover and uncover said opening, means responsive to the movement of said handle to move the shutter in one direction, means adapted to be set by the operation of said handle to temporarily restrain the shutter against return movement, means adapted to automatically actuate the last recited means to control and time the return movement of said shutter, and an additional shutter movable to cover and uncover said opening and operating alternately with the first recited shutter.

10. A machine of the character described embodying a sight opening, a rotatable member movable past said opening, a shutter movable into and out of positions to respectively cover and uncover said opening, means responsive to the movement of said handle to move the shutter in one direction, means adapted to be set by the operation of said handle to temporarily restrain the shutter against return movement, means adapted to automatically actuate the last recited means to control and time the return movement of said shutter, and an additional shutter responsive in its movement to the operation of said handle for covering and uncovering said opening.

11. A machine of the character described embodying a sight opening, a rotatable member movable past said opening, a shutter movable into and out of positions to respectively cover and uncover said opening, means responsive to the movement of said handle to move the shutter in one direction, means adapted to be set by the operation of said handle to temporarily restrain the shutter against return movement, means adapted to automatically actuate the last recited means to control and time the return movement of said shutter, and means also responsive in its operation to the actuation of said handle for rotating said member.

12. A machine of the character described embodying a sight opening, a rotatable member movable past said opening, a shutter movable into and out of positions to respectively cover and uncover said opening, means responsive to the movement of said handle to move the shutter in one direction, means adapted to be set by the operation of said handle to temporarily restrain the shutter against return movement, means adapted to automatically actuate the last recited means to control and time the return movement of said shutter, an additional shutter movable to also cover and uncover said opening, and means also responsive in its operation to the actuation of said handle for rotating said member.

13. A machine of the character described embodying a sight opening, a rotatable member movable past said opening, means for rotating said member, a shutter movable to cover and uncover said opening, means for moving said shutter in one direction, means for controlling and timing the return movement of the shutter, and an additional shutter movable to positions to cover and uncover said opening, one of said shutters, at predetermined times in the cycle of operation of the machine, operating in opposition to the other shutter.

14. A machine of the character described embodying a sight opening, a rotatable member movable past said opening, means for rotating said member, a shutter movable to cover and uncover said opening, means for moving said shutter in one direction, means for controlling and timing the return movement of the shutter, and an additional shutter movable to positions to cover and uncover said opening, one of said shutters, at predetermined times in the cycle of operation of the machine, operating in opposition to the other shutter, both of said shutters being controlled in their movement in one direction by the actuation of said handle.

15. A machine of the character described embodying a casing having a sight opening, a member mounted therein and movable across said opening, a shutter movable to positions to cover and uncover said opening, means for moving said shutter in one direction to uncover said opening, means for timing and controlling the return movement of said shutter, the last said means embodying a motor device having a shaft, a member connected with the shaft and rotatable therewith, a member connected with said shutter and adapted to be positioned upon the said shaft member for maintaining the shutter in a position to uncover said opening, and means operating automatically to disengage the shutter member from the shaft member to permit the shutter to close.

16. A machine of the character described embodying a casing having a sight opening, a member mounted therein and movable across said opening, a shutter movable to positions to cover and uncover said opening, means for moving said shutter in one direction to uncover said opening, means for timing and controlling the return movement of said shutter, the last said means embodying a motor device having a shaft, a member connected with the shaft and rotatable therewith, a member connected with said shutter and adapted to be positioned upon the said shaft member for maintaining the shutter in a position to uncover said opening, and a formation on said shaft member adapted to engage and move the shutter member off of the shaft member by the rotation of said shaft, to permit the shutter to move across said opening.

17. A machine of the character described embodying a sight opening, a rotatable member movable past said opening, a shutter movable to positions to cover and to uncover said opening, an operating handle, article delivery mechanism, means responsive to the operation of said handle for actuating said delivery mechanism, means also responsive to the operation of said handle for actuating the shutter, and means for controlling and timing the movement of the shutter in one direction.

18. A machine of the character described embodying a sight opening, a rotatable member movable past said opening, a shutter movable to positions to cover and uncover said opening, an operating handle, means responsive to the actuation of the handle for moving the shutter in one direction, means operating automatically for timing and controlling the movement of the shutter in the opposite direction, and means also responsive in its operation to the actuation of said handle for rotating said member.

19. A machine of the character described embodying a sight opening, a rotatable member movable past said opening, a shutter movable to positions to cover and to uncover said opening, an operating handle, article delivery mechanism, means responsive to the operation of said handle for actuating the shutter, means for controlling and timing the movement of the shutter in one direction, and an additional shutter movable to positions to cover and uncover said opening, the said additional shutter operating to cover said opening when the first recited shutter is in a position to uncover said opening.

20. A machine of the character described embodying a sight opening, a rotatable member movable past said opening, a shutter movable to positions to cover and uncover said opening, an operating handle, means responsive to the actuation of the handle for moving the shutter in one direction, means operating automatically for timing and controlling the movement of the shutter in the opposite direction, means also responsive in its operation to the actuation of said handle for rotating said member, and an additional shutter movable to positions to cover and uncover said opening, the said additional shutter operating to cover said opening when the first recited shutter is in a position to uncover said opening.

21. In combination, a rotatable member, an operating handle, means responsive to the actuation of the handle for rotating said member in one direction, a shutter movable to positions to cover and uncover a predetermined portion of said member, means also responsive to the operation of said handle for moving the shutter in one direction, mechanism for controlling and timing the return movement of the shutter, means responsive to the operation of said handle for rendering the controlling and timing mechanism active, means for locking the controlling and timing mechanism against actuation, and means for rendering said locking means inactive.

In testimony whereof we have signed our names to this specification, on this 19th day of May, A. D. 1928.

ALFRED D. ANTOINE.
ALBERT E. GEBERT.